United States Patent [19]

Chang et al.

[11] 4,018,849
[45] Apr. 19, 1977

[54] POLYURETHANE POLYOL COMPOSITIONS MODIFIED WITH AN ALKYLENIMINE

[75] Inventors: Wen-Hsuan Chang, Gibsonia; Roger L. Scriven, Penn Hills; Paul J. Prucnal, Monroeville, all of Pa.

[73] Assignee: PPG Industries, Inc., Pittsburgh, Pa.

[22] Filed: Aug. 7, 1975

[21] Appl. No.: 602,856

Related U.S. Application Data

[62] Division of Ser. No. 361,015, May 16, 1973, Pat. No. 3,917,570.

[52] U.S. Cl. .............................. 260/849; 260/39 M; 260/40 TN; 260/75 TN; 260/75 NE; 260/77.5 R; 260/77.5 AN; 260/850
[51] Int. Cl.$^2$ .................. C08L 61/24; C08L 61/28
[58] Field of Search ........................... 260/849, 850

[56] References Cited
UNITED STATES PATENTS

| | | | |
|---|---|---|---|
| 2,915,480 | 12/1959 | Reeves et al. ..................... | 260/2 |
| 3,054,757 | 9/1962 | Britain ........................ | 260/77.5 AC |
| 3,290,416 | 12/1966 | Christensen et al. .............. | 260/901 |
| 3,290,417 | 12/1966 | Christensen et al. .............. | 260/901 |
| 3,658,939 | 4/1972 | Carpenter ....................... | 260/75 NP |
| 3,678,013 | 7/1972 | Minckler ........................ | 260/77.5 R |
| 3,705,076 | 12/1972 | Usala ............................ | 156/331 |
| 3,715,341 | 2/1973 | Uelzmann ........................ | 260/2 EN |

*Primary Examiner*—John C. Bleutge
*Attorney, Agent, or Firm*—William J. Uhl

[57] ABSTRACT

Compositions useful as coating compositions comprise the reaction product of a polyurethane polyol which contains acidic carboxyl groups with an alkylenimine. Particularly desirable coatings are produced by further combining the imine-modified polyurethane polyols with aminoplast resins. The compositions are characterized by improved pigment wetting properties and provide coatings having improved low temperature, flexibility and increased adhesion.

11 Claims, No Drawings

POLYURETHANE POLYOL COMPOSITIONS MODIFIED WITH AN ALKYLENIMINE

This is a division of application Ser. No. 361,015, filed May 16, 1973, now U.S. Pat. No. 3,917,570.

BACKGROUND OF THE INVENTION

Recently, there has been interest in the use of rubbery, resilient materials for areas which are subject to mechanical shock, such as vehicle bumpers and moldings, exposed corners and surfaces of industrial machines, kickplates and other areas of doors and entrances, and the like. Such resilient materials aid in providing protection against permanent damage. However, in order to attain the desired appearance, a decorative and protective coating must be applied to the surface, and this coating is subject to damage during use. Conventional coatings, including those employed on rubber and similar extensible objects heretofore, do not have the required combination of properties to render them commercially feasible. The requisite properties include extensibility, tensile strength, package stability, film stability, impact resistance, adhesion, chemical and humidity resistance, resistance to cracking under temperature-humidity cycling, sprayability at reasonable solids contents, non-toxicity, and sensitivity to moisture.

It is especially difficult to obtain the above properties in combination since, in most instances, the obtention of one or more of the properties desired requires the use of materials and formulations which under ordinary circumstances tend to make the other desired properties less satisfactory.

Recent developments in this area have produced coating compositions which meet the above criteria. These compositions broadly comprise (1) a hydroxyl-containing urethane reaction product of an organic polyisocyanate and a polyhydric material, or, more simply, a polyurethane polyol, and (2) an aminoplast resin. These compositions are storage stable in one package, and when cured, form coatings which are adherent durable and highly extensible. The coatings are particularly useful on resilient and rubbery substrates, such as foam rubber, polyurethane foam and vinyl foam, and on metal surfaces such as mild steel and aluminum.

While the above-described coating compositions have many excellent properties, they also have certain disadvantages, including difficulty in obtaining uniformly satisfactory pigmented compositions; less than desirable low temperature flexibility (i.e., $<-20°$ F); and, in some cases, inadequate intercoat adhesion.

SUMMARY OF THE INVENTION

It has now been found that the overall properties of coating compositions based on polyurethane polyols are greatly improved by utilizing a polyurethane polyol which contains at least 0.075, and preferably at least about 0.10 percent, by weight of acidic carboxyl groups and which has been reacted with an alkylenimine or a substituted alkylenimine. Coatings in which said imine-modified acid groups are included have exceptional adhesion to most surfaces and provide pigmented coatings of outstanding quality. Additionally, the low temperature flexibility of the coatings thus formed is greatly enhanced. Finally, the overall excellent properties of the corresponding compositions without imine-modified units are retained, and are in many instances improved.

The compositions of the instant invention broadly comprise the reaction product of (1) a polyurethane polyol which contains at least 0.075 percent by weight of acidic carboxyl groups, and (2) an alkylenimine. The compositions of the instant invention further include the above-described imine-modified urethane products in combination with an aminoplast resin.

DETAILED DESCRIPTION OF THE INVENTION

The compositions of the instant invention contain as one component a polyurethane polyol which contains at least 0.075 percent by weight of acidic carboxyl groups. This polyurethane polyol, which contains both carboxyl and hydroxyl groups, is reacted with an alkylenimine. The so-treated urethane may then be combined with an aminoplast resin, although it is also possible, but less desirable, to add the alkylenimine after the aminoplast resin has been added.

The polyurethane polyols are generally produced by reacting a polyhydric material, the major portion of which is selected from the group consisting of polyether polyols, polyester polyols and mixtures thereof, with an organic polyisocyanate. The polyhydric material preferably contains (or is formed from) between 0.01 and 1, and most preferably between 0.05 and 1 gram-mole of compounds having a functionality of 3 or more per 500 grams of the polyhydric material, although acceptable but less desirable results are attained if no materials of higher functionality are used.

The conditions of the reaction between the polyhydric material and the polyisocyanate are selected so as to produce an hydroxyl-containing urethane reaction product, i.e., a polyurethane polyol. This can be accomplished by utilizing an equivalent ratio of isocyanate groups in the polyisocyanate to hydroxyl groups in the polyhydric material of less than 1.0 and preferably 0.85 or less, and allowing substantially all the isocyanate groups present to react. When using ratios of 1.0 or less, care must be taken to avoid gelation and for this reason, some monofunctional alcohol may be required. In general, both the polyol content (i.e., materials having a functionality of 3 or more) and the mono-alcohol content must be carefully controlled. One way to ascertain in any given case the relative amounts of polyol and mono-alcohol which should be used to avoid gelation is by carrying out successive tests on a small scale with varying proportions of components. It is, in most cases, more convenient to terminate the reaction at the desired stage (determined by viscosity), by the addition of a compound which reacts with the residual isocyanate groups present; this has the additional advantage that higher ratios of isocyanate to hydroxyl can be utilized.

Regardless of the method chosen, the reaction between the polyhydric material and the polyisocyanate should generally be terminated when the reaction product has an intrinsic viscosity of 1.0 deciliters per gram or less and preferably 0.80 deciliter per gram or less, since it has been found that resins with high viscosities exhibit poor sprayability. It should be noted that useful products are provided once the reaction between the polyhydric material and the polyisocyanate begins, although preferred products begin to be obtained when the intrinsic viscosity reaches about 0.05. Generally, to start the reaction, heat (e.g., 125° F.) and catalyst (e.g., dibutyltin dilaurate) may be used. The use of heat and catalyst is of course dependent upon the overall composition and the rate of reaction desired.

In producing the desired polyurethane polyol, it is necessary that the polyhydric material employed possess certain properties in order to obtain coatings of the desired characteristics. When using a polyether polyol, these properties are obtained by selecting a polyether polyol, or a mixture of polyether polyols, having relatively long chains per hydroxyl group, and which thus has a hydroxyl equivalent of at least about 100 and preferably at least about 300.

The polyether polyol component in most cases consists essentially of one or more diols. Triols or higher polyols can also be used provided the total amount of compounds in the polyhydric component having a functionality of 3 or more is not more than one gram-mole per 500 grams of the polyhydric material. While it is not always necessary to have a triol or higher polyol present, some branching is desirable, although the polyether should not be highly branched. There may also be present a small amount of monoalcohol, particularly if larger proportions of polyols of higher functionality are used. In certain instances, such as where very high molecular weight polyether polyols are used, the polyols can be largely or even entirely made up of compounds of functionality higher than 2.

Among the preferred polyether polyols are poly(oxyalkylene)glycols. Included are poly(oxytetramethylene)glycols, poly(oxyethylene)glycols, poly(oxytrimethylene)glycols, poly(oxypentamethylene)glycols, poly(oxypropylene)glycols, etc. The preferred polyether polyols of this class are poly(oxytetramethylene)glycols of molecular weight between about 400 and about 10,000.

Also useful are polyether polyols formed from the oxyalkylation of various polyols, for example, glycol such as phenylene glycol, 1,6-hexanediol, and the like, or higher polyols, such as trimethylolpropane, trimethylolethane, pentaerythritol, and the like. Polyols of higher functionality which can be utilized as indicated can be made, for instance, by oxyalkylation of compounds such as sorbitol or sucrose. One commonly utilized oxyalkylation method is by reacting a polyol with an alkylene oxide, e.g., ethylene or propylene oxide, in the presence of an acidic or basic catalyst.

In addition to the methods indicated, the polyether polyol can be produced by any of the several known techniques, with the reaction conditions and the ratio of reactants chosen so as to provide a product having residual hydroxyl groups, i.e., a polyether polyol, having a hydroxyl equivalent of at least about 100 and preferably not above about 10,000.

Where polyester polyols are employed, the requisite properties are attained by selecting a polyester polyol, or a mixture of polyester polyols, which is formed from a polyol component having an average functionality of at least about 1.9 and an acid component having an average functionality of at least about 1.9. The polyol component in most cases consists essentially of one or more diols with up to about 25 mole percent of polyols present having 3 or more hydroxyl groups. When triols or higher polyols are used, care must be taken to insure that the total amount of compounds in the polyhydric component having a functionality of 3 or more is not more than 1 gram-mole per 500 grams of polyhydric material. While it is not always necessary to have a triol or higher polyol present, some branching is desirable, although the polyester should not be highly branched. There may also be present a small amount of monoalcohol, particularly if larger proportions of higher polyols are used. In certain instances, such as where very high molecular weight polyols are used, the polyols can be largely or even entirely made up of compounds of functionality higher than two.

The diols which are usually employed in making the polyester include alkylene glycols, such as ethylene glycol, propylene glycol, butylene glycol, and neopentyl glycol, and other glycols such as hydrogenated bisphenol A, cyclohexane dimethanol, caprolactone diol (e.g., the reaction product of caprolactone and ethylene glycol), hydroxyalkylated bisphenols, polyether glycols, e.g., poly(oxytetramethylene)glycol, and the like. However, other diols of various types and, as indicated, polyols of higher functionality can also be utilized. Such higher polyols can include, for example, trimethylolpropane, trimethylolethane, pentaerythritol, and the like, as well as higher molecular weight polyols such as those produced by oxyalkylating low molecular weight polyols. An example of such a higher molecular weight polyol is the reaction product of 20 moles of ethylene oxide per mole of trimethylolpropane.

The acid component of the polyester consists primarily of monomeric carboxylic acids or anhydrides having 2 to 14 carbon atoms per molecule. The acids should have an average functionality of at least about 1.9; the acid component in most instances contains at least about 75 mole percent of dicarboxylic acids or anhydrides. The functionality of the acid component is based upon considerations similar to those discussed above in connection with the alcohol component, the total functionality of the system being kept in mind.

Among the acids which are useful are phthalic acid, isophthalic acid, terephthalic acid, tetrahydrophthalic acid, hexahydrophthalic acid, adipic acid, azelaic acid, sebacic acid, malic acid, glutaric acid, chlorendic acid, tetrachlorophthalic acid, and other dicarboxylic acids of varying types. The polyester may include minor amounts of monobasic acid, such as benzoic acid, and also there can be employed higher polycarboxylic acids, such as trimellitic acid and tricarballylic acid. Also useful in preparing the polyesters herein are hydroxy acids, such as 6-hydroxyhexanoic acid, 8-hydroxyoctanoic acid, tartaric acid, and the like. Finally, certain materials with react in a manner similar to acids to form polyester polyols are also useful; such materials include lactones such as caprolactone and butyralactone. Where acids are referred to above, it is understood that the anhydrides of those acids which form anhydrides can be used in place of acid. It is preferred that the polyester include an aliphatic dicarboxylic acid as at least part of the acid component.

While polyester polyols have been specifically disclosed, useful products are also attainable by substituting a polyesteramide polyol, or a mixture of polyesteramide polyols, for a part of or all of the polyester polyol. The polyesteramide polyols are produced by conventional techniques from the above-described acids and diols, and minor proportions of diamines or aminoalcohols. Suitable diamines and aminoalcohols include hexamethylene diamine, ethylene diamine, monoethanolamine, phenylenediamines, toluene diamines, and the like. It is to be understood that the polyester polyols useable in the instant invention include such polyesteramide polyols.

The polyester is produced using conventional techniques, with the reaction conditions and the ratio of reactants chosen so as to provide a product having residual hydroxyl groups, i.e., a polyester polyol. The number of hydroxyls present in the product can be varied, but it is preferred that its hydroxyl value be at least about 20 and preferably more than 80.

The overall functionality per unit weight of the polyhydric material used to produce the polyurethane polyol is important. The polyhydric material preferably should contain (or be formed from) at least about 0.01 gram-mole, and most preferably at least about 0.05 gram-mole and not more than one gram-mole of compounds having a functionality of 3 or more per 500 grams of the polyhydric material. By "functionality" is meant the number of reactive hydroxyl and carboxyl groups per molecule, with anhydride groups being considered as equivalent to two carboxyl groups. It is noted that certain compounds useful in this invention contain both hydroxyl and carboxyl groups; examples include 6-hydroxyhexanoic acid, 8-hydroxyoctanoic acid, tartaric acid, and the like.

While the polyether polyol or the polyester polyol may constitute the entire polyhydric component, mixtures of polyether polyols and mixtures of polyester polyols, as well as mixtures of polyether and polyester polyols, may be used in widely varied proportions. In addition, other hydroxyl-containing compounds may be added either with the polyhydric material to the polyisocyanate, or to the reaction mixture of the polyhydric material and the polyisocyanate. Such compounds include low molecular weight polyols, such as 1,4-butanediol, neopentyl glycol, trimethylolpropane, tris(hydroxyethyl) isocyanurate, N,N'-bis(hydroxyethyl)-dimethyl hydantoin, and Ester Diol 204 (2,2-dimethyl-3-hydroxypropyl-2,2-dimethyl-3-hydroxypropionate); carbamates of polyols, such as O-hydroxyethyl carbamate and O,N-bis(hydroxyethyl) carbamate; monohydric alcohols; and polyfunctional alcohols such as ethanolamine. Other active hydrogen-containing compounds may be added to the reaction mixture, including water; polyamines such as isophorone diamine, p-methane diamine, propylene diamine, hexamethylene diamine and diethylene triamine; and mixtures of the above-mentioned polyamines with ketones, such as cyclohexanone, butanone, and acetone. When using polyamines and ketones, it is preferable to partially react the two, as by holding at room temperature for about one hour, before adding to the urethane reaction mixture, although acceptable results for some purposes are obtained by merely adding the amine and ketone to the reaction mixture.

The polyisocyanate which is reacted with the polyhydric material can be essentially any organic polyisocyanate, e.g., hydrocarbon polyisocyanates or substituted hydrocarbon diisocyanates. Many such organic polyisocyanates are known in the art, including p-phenylene diisocyanate, biphenyl diisocyanate, toluene diisocyanate, 3,3'-dimethyl4,4'-diphenylene diisocyanate, 1,4-tetramethylene diisocyanate, hexamethylene diisocyanate, 2,2,4-trimethylhexane-1,6 diisocyanate, methylene bis(phenyl isocyanate), lysine methyl ester diisocyanate, bis(isocyanatoethyl)fumarate, isophorone diisocyanate and methyl cyclohexyl diisocyanate. There can also be employed isocyanate-terminated adducts of diols, such as ethylene glycol, 1,4-butylene glycol, polyalkylene glycols, etc. These are formed by reacting more than one mole of a diisocyanate, such as those mentioned, with one mole of a diol to form a longer chain diisocyanate. Alternatively, the diol can be added along with the diisocyanate.

While diisocyanates are preferred, higher polyisocyanates can be utilized as part of the organic polyisocyanate. Examples are 1,2,4-benzene triisocyanate and polymethylene polyphenyl isocyanate.

It is preferred to employ an aliphatic diisocyanate, since it has been found that these provide better color stability in the finished coating. Examples include bis-(isocyanatocyclohexyl)methane; 1,4-butylene diisocyanate; methylcyclohexyl diisocyanate, and isophorone diisocyanate.

The conditions of the reaction between the polyhydric material and the polyisocyanate are chosen so as to produce an ungelled hydroxyl-containing urethane reaction product, i.e., a polyurethane polyol. This can be accomplished by utilizing an equivalent ratio of isocyanate groups to hydroxyl groups of less than 1.0, controlling both the polyol and monoalcohol content, and allowing substantially all the isocyanate groups present to react. Alternatively, regardless of the equivalent ratio selected, a compound may be added to the reaction mixture, which will react with residual isocyanate groups and which will effectively terminate the reaction. Suitable compounds include water; ammonia; monofunctional alcohols, such as n-butanol; polyfunctional alcohols, such as monoethanolamine, ethylene glycol, tris(hydroxyethyl)isocyanurate, N,N'-bis(hydroxyethyl)dimethyl hydantoin, trimethylol propane and diethanolamine; primary and secondary amines, such as butylamine, morpholine, allylamine and diethylamine; and, the hereinabove-described polyester polyols. It is noted that the amount of terminating agent added is such that the equivalent ratio of isocyanate groups to the isocyanate-reactive groups of the terminating agent is less than 1.0. Further, when the polhydric material contains no compounds having a functionality of 3 or more, a terminating agent having a functionality of at least 2 should be used to insure that a hydroxyl containing product is formed.

In one preferred embodiment of the invention, a polyfunctional alcohol is used to terminate the reaction at the desired stage (determined by the viscosity), thereby also contributing residual hydroxyl groups. Particularly desirable for such purposes are aminoalcohols, since the amino groups preferentially react with the isocyanate groups present. It should again be noted that regardless of the equivalent ratio chosen, the reaction should generally be terminated when the intrinsic viscosity is 1.0 or less, since resins having high intrinsic viscosities tend to exhibit poor sprayability, and are difficult to handle.

While the ratios of the components of the polyhydric material, the polyisocyanate and any terminating agent may be varied, the amounts of the components should be chosen so as to avoid gelation and so as to produce an ungelled, urethane reaction product which contains hydroxyl groups. The hydroxyl value of the urethane reaction product (as determined by ASTM Designation E 222-67, Method B) preferably should be at least 10 and in most cases is between about 20 and about 200.

Methods of manufacturing various polyurethane polyols useable in the instant invention are described and claimed in applications Ser. Nos. 313,060, filed Dec. 7, 1972, now abandoned; 347,022, filed Apr. 2, 1973, now abandoned; and 361,010 filed May 16, 1973, now abandoned.

As noted earlier, the polyurethane polyols of this invention contain at least 0.075, and preferably at least 0.10 percent by weight of acidic carboxyl groups and will generally have acid values (as determined by ASTM Designation D 1639-70) greater than about 1 and preferably between 2 and 30. The polyurethane polyols previously described can be modified to include the requisite amount of acidic groups in a variety of different ways. An acidic carboxyl group source material may be reacted directly with the polyhydric material and the polyisocyanate, or with the reaction mixture at any time before termination of the reaction. Alternatively, following termination, the polyurethane polyol may be reacted with either an acid anhydride or a polyacid. Finally, the polyhydric material used to make the urethane product will in many instances have a sufficiently high acid value to provide the requisite acid content.

As hereinbefore noted, acidic carboxyl group source materials may be reacted directly with the polyhydric material and the polyisocyanate or with the reaction mixture at any time before termination of the reaction. Suitable sources of acidic groups to be used in this manner include tartaric acid; glycolic acid, dimethylolpropionic acid, and acid-containing polyesters and polyethers, such as those previously described. Since the carboxyl groups present in these source materials do not generally react with isocyanate groups under mild conditions, the reaction conditions are chosen so that the carboxyl groups are not consumed. Generally, then, extremely high temperatures should be avoided to prevent reaction between the isocyanate groups and the carboxyl groups.

Acidic carboxyl groups may be introduced into the polyurethane polyols by reacting such polyols (i.e., after termination) with either acid anhydrides or polyacids. Alternatively, the acid anhydrides and polyacids may be reacted directly with the polyhydric material and the polyisocyanate, or with the reaction mixture at any time before termination of the reaction. Suitable anhydrides include phthalic anhydride, maleic anhydride, trimellitic anhydride and succinic anhydride. The amount of anhydride used should be less than about 5 percent by weight of the total mixture. The product formed should be anhydride free as determined by infrared techniques. Generally the reaction mixture should be heated to from about 100 to about 130° C. Suitable polyacids include adipic acid, isophthalic acid, oxalic acid and tartaric acid. The amount of polyacid used should be less than about 5 percent by weight of the total mixture. For this reaction to be effective, acid catalyst (e.g., p-toluene sulfonic acid) is usually necessary with the water of condensation subsequently removed. The minimum temperature of reaction is generally about 80° C. although suitable temperatures are generally dependent upon the overall composition and the rate of reaction desired.

Finally, in many instances the polyhydric material used to produce the urethane product will have a sufficient acid value to provide the requisite acid content to the urethane product. Thus, while the polyhydric material must have a minimum hydroxyl value to attain the disclosed results, if it also has an acid value of at least about 1, and preferably between 3 and 20, no external source of acid groups is required.

It is noted that regardless of the method chosen to introduce carboxyl groups into the polyurethane polyol, the polyurethanes thus produced will contain both hydroxyl and carboxyl groups. Once the polyurethane polyol is made to contain the requisite amount of acidic group, it is then reacted with a suitable alkylenimine.

Various alkylenimines, including substituted alkylenimines, can be used to modify the acidic groups. Generally, the alkylenimines used should have either two or three carbon atoms in the alkylenimine ring or rings. The preferred class of such imines are those of the family:

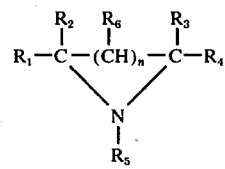

where $R_1$, $R_2$, $R_3$, $R_4$ and $R_5$ are each hydrogen; alkyl, such as methyl, ethyl, propyl, or the like, having for example, up to about 20 carbon atoms; aryl, such as phenyl or the like; alkaryl, such as tolyl, xylyl or the like; or aralkyl, such as benzyl phenethyl or the like. $R_6$ in the above formula is hydrogen or a lower alkyl radical usually having not more than about 6 carbon atoms, and $n$ is an integer from 0 to 1.

It is intended that the groups designated by the above formula include any substituted radicals of the classes indicated where the substituent groups do not adversely affect the basic nature of the imine in the reaction. Such substituents can include the groups such as carbonyl, cyano, halo, amino, hydroxy, alkoxy, carbalkoxy and nitrile. The substituted groups may thus be cyanoalkyl, acyl (e.g., acetyl), haloalkyl, aminoalkyl, hydroxyalkyl, alkoxyalkyl, carbalkoxyalkyl, and similar substituted derivatives of aryl, alkaryl and aralkyl groups where present.

It will be recognized by those skilled in the art that compounds containing certain combinations of the above groups cannot be obtained, for example, because of factors such as steric hindrance or intra-molecular interaction. For this reason, in most of the compounds of the class described, several of the groups designated by $R_1$ through $R_6$ represent hydrogen. However, the efficacy of the various alkylenimines (whether or not within the above formula) does not depend upon the particular nature of any of the substituents, but rather the imine linkage; thus, beneficial results are obtained with urethanes modified by any of those compounds within the above class.

A number of specific examples of alkylenimines within the class described are as follows:
Ethylenimine (aziridine)
1,2-Propylenimine (2-methyl aziridine)
1,3-Propylenimine (azetidine)
1,2-Dodecylenimine (2-decyl aziridine)
1,1-Dimethyl ethylanimine (2,2-dimethyl aziridine)
Phenyl ethylenimine (2-phenyl aziridine)
Tolyl ethylenimine (2-(4-methylphenyl)aziridine
Benzyl ethylenimine (2-phenylmethyl aziridine)
1,2-Diphenyl ethylenimine (2,3-diphenyl aziridine)
Hydroxyethyl ethylenimine (2-(2-hydroxyethyl)aziridine)
Aminoethyl ethylenimine (2-(2-aminoethyl)aziridine)
2-Methyl propylenimine (2-methyl azetidine)

3-Chloropropyl ethylenimine (2-(3-chloropropyl)aziridine)

p-Chlorophenyl ethylenimine (2-(4-chlorophenyl)aziridine)

Methoxyethyl ethylenimine (2-2-methoxyethyl)aziridine)

Dodecyl aziridinyl formate (dodecyl 1-aziridinyl carboxylate)

Carbethoxyethyl ethylenimine (2-(2-carboethoxyethyl)aziridine)

N-Ethyl ethylenimine (1-ethyl aziridine)

N-Butyl ethylenimine (1-butyl aziridine)

N-(2-Aminoethyl)ethylenimine (1-(2-aminoethyl)aziridine)

N-(Phenethyl)ethylenimine (1-(2-phenylethyl)aziridine)

N-(2-Hydroxyethyl)ethylenimine (1-(2-hydroxyethyl)aziridine)

N-(Cyanoethyl)ethylenimine (1-cyanoethyl aziridine)

N-Phenyl ethylenimine (1-phenyl aziridine)

N-Tolyl ethylenimine (1-)2-methylphenyl)aziridine)

N-(p-Chlorophenyl)ethylenimine (1-(4-chlorophenyl)aziridine)

N-(2-Carboethoxy-1-ethyl)ethylenimine (ethyl aziridyl propionate)

Because of their availability and because they have been found to be among the most effective, the preferred imines are alkylenimines and substituted alkylenimines having 2 to 4 carbon atoms, and especially ethylenimine, 1,2-propylenimine, and N-hydroxyethyl ethylenimine.

In addition to the preferred class of imines, it is noted that imines not within the formula indicated may also be used. For example, satisfactory results may be attained by using alkylenimines containing more than one alkylenimine ring, such as ethylene-1,2-bisaziridine and 1,2,4-tris(2-1-aziridinylethyl)trimellitate. Similarly, alkylenimines, such as N-aminoethylenimine and the like, can be used. It is to be understood that the term, alkylenimines, as that term is used in the instant application includes all the above-described alkylenimines, both substituted and otherwise.

The reaction with the imine takes place upon admixing the imine and the acidic group containing polyurethane polyol and heating to a moderate temperature, e.g., 50° C. to 150° C., although higher or lower temperatures may be used depending upon the desired reaction time. The imine reacts with the acidic groups, but the exact nature of the reaction which takes place under these circumstances and the structure of the product obtained is not known with certainty. It would appear that in the case of ethylenimines and 1,2-propylenimine, the reaction to some extent at least involves the production of a primary amino group.

Provided that at least some imine-modification is attained, the improved properties are achieved when all or part of the acidic groups present are reacted with the imine, the extent of the reaction being dependent upon the amount of imine employed. In order to attain the beneficial results from the imine-modification, it is only necessary that at least about 0.03 percent by weight of acidic groups, based upon the total weight of the urethane polymer, be reacted with imine. In general, the equivalent ratio of imine to carboxyl groups can vary from about 0.02 to 1.

While the imine-modified urethanes may themselves be utilized as coating compositions, it is greatly preferred that they be combined with aminoplast resins.

Aminoplast resins are aldehyde condensation products of melamine, urea, and similar compounds; products obtained from the reaction of formaldehyde with melamine, urea or benzoguanamine are most common and are preferred herein. However, condensation products of other amines and amides can also be employed, for example, aldehyde condensates of triazines, diazines, triazoles, guanadines, guanamines and alkyl- and aryl-substituted derivatives of such compounds, including alkyl and aryl-substituted ureas and alkyl- and aryl-substituted melamines. Some examples of such compounds are N,N'-dimethylurea, benzourea, dicyandimide, formaguanamine, acetoguanamine, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 2,4,6-triethyltriamino-1,3,5-triazine, and the like.

While the aldehyde employed is most often formaldehyde, other similar condensation products can be made from other aldehydes, such as acetaldehyde, crotonaldehyde, acrolein, benzaldehyde, furfural, and others. The aminoplast resins contain methylol or similar alkylol groups, and in most instances at least a portion of these alkylol groups are etherified by a reaction with an alcohol to provide organic solvent-soluble resins. Any monohydric alcohol can be employed for this purpose, including such alcohols as methanol, ethanol, propanol, butanol, pentanol, hexanol, heptanol and others, as well as benzyl alcohol and other aromatic alcohols, cyclic alcohols such as cyclohexanol, monoethers of glycols such as Cellosolves and Carbitols, and halogen-substituted or other substituted alcohols, such as 3-chloropropanol. The preferred aminoplast resins are substantially etherified with methanol or butanol.

For optimum properties, it is preferred to include in the composition a polymeric polyol having a low glass transition temperature, i.e., having a glass transition temperature below about 25° C. The inclusion of such a polymeric polyol gives a balance of flexibility and hardness. Among the preferred polymeric polyols are polyether polyols; especially preferred are poly(oxyalkylene) glycols such as polyethylene glycol, polypropylene glycol, and other such glycols having up to about 6 carbon atoms separating each pair of oxygen atoms. A specific preferred polyol is poly(oxytetramethylene) glycol. Other highly desirable polymeric polyols are polyester polyols having the desired glass transition temperature, especially those produced from acyclic reactants such as adipic acid and azelaic acid and alkylene glycols; poly(neoptenyl adipate) is a useful example. Still other polymeric polyols of suitable properties include condensates of lactones with polyols, such as the product from caprolactone and ethylene glycol, propylene glycol, trimethylolpropane, etc.

The polymeric polyol can be incorporated into the composition in various ways. In some instances, the polyhydric material employed can serve as the polymeric polyol, but this may not provide a suitable hardness for many applications. More usually, the "soft" polymeric polyol is used in conjunction with a polyhydric material (or constituent thereof) having a higher glass transition temperature. One method is to include the polymeric polyol in the polyhydric material as part of the polyol component; another way is to produce an isocayanato-terminated adduct or prepolymer from the polymeric polyol and the polyisocyanate; a third method is to blend the polymeric polyol as such with the polyhydric material, before or after the polyhydric material is reacted with the polyisocyanate; a fourth method is to blend the polymeric polyol with the aminoplast resin before addition to the urethane reaction product. The choice of method depends upon the particular components used and the properties desired, but in each instance the product contains both "hard" and "soft" segments in a type of block copolymer.

The proportions of the above components can be varied to provide certain properties. For example, higher levels of polymeric polyol result in somewhat softer and more extensible coatings, whereas harder, more resistant coatings are obtained by increasing the proportion of aminoplast resin. The amounts employed depend in large part upon the nature of the particular components, e.g., the specific polyhydric material, aminoplast resin, as well as the type of polymeric polyol, if any, employed.

In most cases the overall compositions contain from about 40 to about 95 percent by weight of imine-modified polyurethane polyol, and from about 5 to about 60 percent by weight of aminoplast resin. The preferred compositions in which a polymeric polyol is included contain from about 45 to about 90 percent by weight of imine-modified polyurethane polyol, from about 2 to about 20 percent by weight of polymeric polyol and from about 5 to about 40 percent by weight of aminoplast.

In addition to the components above, the compositions ordinarily contain other optional ingredients, including various pigments of the type ordinarily utilized in coatings of this general class. In addition, various fillers, plasticizers, anti-oxidants, flow control agents, surfactants, and other such formulating additives are employed in many instances. The composition is ordinarily contained in a solvent, which can be any solvent or solvent mixture in which the materials employed are compatible and soluble to the desired extent.

The compositions herein can be applied by any convenient method, including brushing, dipping, flow coating, etc., but they are most often applied by spraying. Usual spray techniques and equipment are utilized. They can be applied over virtually any substrate, including wood, metals, glass, cloth, plastics, foams, and the like, as well as over various primers.

The coating compositions containing the aminoplast resins are cured at elevated temperatures. In most cases the cure schedule is from about 20 to about 40 minutes at 140° to 260° F. Higher or lower temperatures with correspondingly shorter and longer times can be utilized, although the exact cure schedule best employed depends in part upon the nature of the substrate as well as the particular components of the composition. Acid catalysts and other curing catalysts can be added to aid in curing if desired; these can permit the use of lower temperatures and/or shorter times.

The invention will be further described in connection with several examples which follow. These examples are given as illustrative of the invention and are not to be construed as limiting it to their details. All parts and percentages in the examples and throughout the specification are by weight unless otherwise indicated.

EXAMPLE I

The following were charged to a reactor:

|  | Parts by Weight |
|---|---|
| Polycaprolactone polyol (reaction product of caprolactone and diethylene glycol, molecular weight 1250) | 585 |
| Poly(hexanediol) adipate (molecular weight = 1000) | 585 |
| Methylbutyl ketone | 500 |
| Methane-bis(cyclohexyl isocyanate) | 605 |
| Dibutyltin dilaurate | 0.02 |

This mixture was heated at 95° C. for 1 hour. To this mixture were added the following:

|  | Parts by Weight |
|---|---|
| 2,2-Dimethyl-3-hydroxypropyl-2,2-dimethyl-3-hydroxypropionate (Ester Diol 204) | 102 |
| Trimethylolpropane | 90 |
| Dimethylolpropionic acid | 70 |

This resin mixture was held at 100° C. for 4 hours. The reaction was then terminated with 25.0 parts of monoethanolamine and 66.0 parts of a polycaprolactone polyol (reaction product of caprolactone and trimethylolpropane; molecular weight of 300). After ½ hour at 95° C., 700 parts of an alcohol mixture (isopropyl butyl = 3/1) were added. The resultant polyurethane polyol contained 1.0 percent by weight of acidic carboxyl groups, had an acid value of 5.93 and a hydroxyl value (at 100 percent solids) of 54.3, contained 46 percent solids and had a Gardner-Holdt viscosity of X—Y.

The above polyurethane polyol was then modified by blending the following:

|  | Parts by Weight |
|---|---|
| Polyurethane polyol | 2775 |
| Hydroxyethylethylenimine | 13.9 |

This mixture was heated at 100° C. for 1 hour. The resultant imine-modified resin had an acid value of about 3.6, a Gardner-Holdt viscosity of Y-Z and a total non-volatile solids content of about 47.1 percent.

The imine-modified polyurethane polyol gave an excellent dispersion of transparent iron oxide pigment. A sample of the imine-modified polyurethane polyol was formulated as follows:

|  | Parts by Weight |
|---|---|
| Imine-modified polyurethane polyol | 160 |
| Methylated melamine formaldehyde resin (Rohm and Haas MM 83) | 31 |
| Para-toluene sulfonic acid | 0.2 |

The resulting mixture was spray-applied to a metal sheet and a polypropylene sheet, and cured for 30 minutes at 250° F. The resulting cured films had the following properties:

| Reverse Gardner Impact | >160 inch-pounds |
|---|---|
| Sward Hardness (over metal) | 18 |
| Tensile strength | 2700 p.s.i. |
| Elongation at break | 150 percent |

EXAMPLE II

The following were charged to a reactor:

| | Parts by Weight |
|---|---|
| Polyester polyol* (66 percent solids in methyl isobutyl ketone) | 1910 |
| Polycaprolactone polyol (reaction product of diethylene glycol and caprolactone; molecular weight about 1250) | 744 |
| Trimethylolpropane | 115 |
| Dimethylolpropionic acid | 33 |
| Methane-bis(cyclohexyl isocyanate) "Hylene W" | 530 |
| Methylbutyl ketone | 705 |

*Reaction product of:

| | Parts by Weight |
|---|---|
| Neopentyl glycol | 126.9 |
| Trimethylolpropane | 22.1 |
| Adipic Acid | 72.3 |
| Isophthalic acid | 123.2 |
| Dibutyltin oxide | 0.1 | having an acid value of 2.6 and a hydroxyl value of 54.0.

This mixture was heated at 75° C for 5 hours. There were then added 14.0 parts of monoethanolamine and 74.0 parts of a polycaprolactone triol (the reaction product of caprolactone and trimethylolpropane, with a molecular weight of about 300). The resultant polyurethane polyol had an intrinsic viscosity of less than 0.8.

After heating for 20 minutes at 80° C., the reaction mixture was cooled to 60° C. and 17 parts of propylenimine was added over a period of 10 minutes. The mixture was then heated at 100° C. for 1 hour, followed by addition of 560 parts of a 3 to 1 mixture of isopropyl alcohol and butyl alcohol. The resultant imine-modified resin had a Gardner-Holdt viscosity of Y—Z, a hydroxyl value at 100 percent solids of about 48.0, and a total non-volatile solids content of about 54.4 percent.

The imine-modified polyurethane polyol gave an excellent dispersion of transplant iron oxide pigment, and when cured with an aminoplast resin formed a film having excellent impact resistance and flexibility.

EXAMPLE III

The following were charged to a reactor;

| | Parts by Weight |
|---|---|
| Polycaprolactone polyol (caprolactone and diethylene glycol; molecular weight 1250) | 773 |
| Methylbutyl ketone | 550 |
| Methane-bis(cyclohexylisocyanate) | 490 |
| Dibutyltin dilaurate | 0.38 |

This mixture was maintained at 40°–45° C. for about 3 hours. The mixture is then heated to 80°–85° C. for about 1-½ hours. To this reaction mixture was then added a blend of the following:

| | Parts by Weight |
|---|---|
| Isophorone diamine | 78.2 |
| Cyclohexanone | 160.0 |

The reaction mixture was held at 80°–85° C. for approximately 2 hours. The reaction was then terminated by adding 83.0 parts of trimethylolpropane. The resultant polyurethane polyol had an intrinsic viscosity of less than 0.8. Twenty-five parts of phthalic anhydride were then added to the polyurethane polyol, and the resin was heated to 100°–110° C. and held for about 2 hours. To the reaction mixture were then added 14.7 parts of hydroxyethylethylenimine and the temperature was held at 75° C. for 30 minutes. There were then added 188 parts of ethylcellosolve, 140 parts of isopropyl alcohol and 48 parts of butyl alcohol. The resultant imine-modified resin had an acid value of about 1.0, a Gardner-Holdt viscosity of $Z^4$–$Z^5$, and a total non-volatile solids content of about 43.6 percent. The resin formed good pigment dispersions and when cured with an aminoplast resin formed a film having good elastomeric properties.

EXAMPLE IV

The following were charged to a reactor:

| | Parts by Weight |
|---|---|
| Polycaprolactone diol (caprolactone and diethylene glycol; molecular weight = 1250) | 708 |
| Polycaprolactone triol (caprolactone and trimethylolpropane; molecular weight = 540) | 134.5 |
| Methane-bis(cyclohexyl isocyanate) | 400 |
| Dibutyltin oxide | 1.2 |
| Methyl isobutyl ketone | 720 |

The mixture was heated to 110° C. for 1.5 hours, after which a blend of 49.4 parts of isophorone diamine and 100 parts of cyclohexanone was added. The mixture was maintained at 80° C. for 3 hours, after which 11.8 parts of glycolic acid and 2.4 parts of dibutyltine dilaurate were added. The mixture was then heated to about 90° C. for 1 and ½ hours. Finally, 17.4 parts of monoethanolamine were added to terminate the reaction.

To the acid-containing polyurethane polyol was added 13.5 parts of hydroxyethylethylenimine, 205 parts of ethylcellosolve and 52 parts of butyl alcohol. The reaction took place at about 75° C. for about 30 minutes.

The resultant imine-modified polyurethane polyol had an acid value of 1.29, Gardner-Holdt viscosity of $Z^1$–$Z^2$, and a total non-volatile solids content of about 37.0 percent. The resin formed good pigment dispersions and when cured with an aminoplast resin formed a film having good elastomeric properties.

EXAMPLE V

The following were charged to a reactor:

| | Parts by Weight |
|---|---|
| Poly(oxytetramethylene)glycol (molecular weight = 1000) | 240 |
| Poly(hexanediol) adipate (molecular weight = 1000) | 296 |
| Ester Diol 204 | 51 |
| Trimethylolpropane | 45 |
| Dimethylolpropionic acid | 35 |
| Methane-bis(cyclohexyl isocyanate) | 337 |
| Methylbutyl ketone | 850 |
| Dibutyltin dilaurate | 0.01 |
| Diazabicyclooctane | 4.7 |

This mixture was heated at 95° C. for 5-½ hours. The reaction was then terminated with 6.0 parts of monoethanol amine and 33 parts of polycaprolactone triol (reaction product of caprolactone and trimethylolpropane; molecular weight = 300).

To 780 parts of the above polyurethane polyol were added 45 parts of n-butanol. This mixture was held at 100° C. for ½ hour to insure that all residual isocyanate groups were reacted. Then, 4.8 parts of hydroxyethylethylenimine were added and the mixture was held at 100° C. for about 1 hour. Isopropanol was then added (135 parts) to reduce the resin viscosity. The resultant product had an acid value of 4.17, a total solids content of 44 percent, and a Gardner-Holdt viscosity of W-. The imine-modified polyurethane polyol formed good pigment dispersions, and when cured with aminoplast resin formed a film having good elastomeric properties.

EXAMPLE VI

To 780 parts of the polyurethane polyol of Example V were added 4.3 parts of succinic anhydride. The mixutre was held at 100° C. for 1 hour, after which time infrared analysis showed no residual anhydride. The resin viscosity was then reduced by adding 180 parts of an alcohol mixture (isopropanol/butanol = 3/1).

To 400 parts of the above formed product were added 2.4 parts of hydroxyethylenimine. This mixture was held at 95° C. for about 1 hour. The resultant product had an acid value of 6.52, a total solids content of 43.7 percent, and a Gardner-Holdt viscosity of V—W. The imine-modified polyurethane polyol formed good pigment dispersions and when cured with aminoplast resin formed a film having good elastomeric properties.

EXAMPLE VII

A reaction mixture was formed using a polyester polyol, similar to the polyester polyol of Example II, having a hydroxyl value of 54.0 and an acid value of 8.0, by blending the following:

| | Parts by Weight |
|---|---|
| Polyester polyol | 50 |
| Methylisobutyl ketone | 9.6 |
| Methane-bis(cyclohexyl isocyanate) | 3.6 |

This mixture held at 71° C. for 4 hours, after which were added 4.3 parts of isopropanol, 1.9 parts of n-butanol and 0.09 parts of monoethanolamine. The resultant polyurethane polyol had a Gardner-Holdt viscosity of X—Z, a non-volatile solids content of about 54 percent, an acid value of 5 and an intrinsic viscosity of less than 0.80.

To 850 parts of the above polyurethane polyol were added 2.8 parts of hydroxyethylenimine. The mixture was held at 95° C. for 1 hour and then cooled.

The resultant imine-modified polyurethane polyol had a solids content of 56.4 percent, an acid value of 4.3, and a Gardner-Holdt viscosity of Y—Z. This resin formed excellent pigment dispersions and when cured with an aminoplast resin formed a film having excellent elastomeric properties.

In a similar manner, coating compositions of desirable properties are produced using other polyhydric materials, other polyisocyanates, other alkylenimines, and other acidic carboxyl source materials in place of the materials specifically shown in the examples.

According to the provisions of the Patent Statutes, there are described above the invention and what are now considered to be its best embodiments. However, within the scope of the appended claims, it is to be understood that the invention can be practiced otherwise than as specifically described.

We claim:
1. A coating composition comprising:
   A. the reaction product of:
      1. an ungelled, carboxyl-hydroxyl-containing urethane reaction product having an acid value of at least 1, and having an intrinsic viscosity of 1.0 deciliter per gram or less; and
      2. an alkylenimine, wherein said alkylenimine was 2 or 3 carbon atoms per alkylenimine ring;
   whereby at least about 0.03 percent by weight of acidic groups based on total weight of the urethane reaction product are reacted with the alkylenimine; and
   B. an aminoplast resin.
2. A coating composition according to claim 1 wherein said alkylenimine is of the formula:

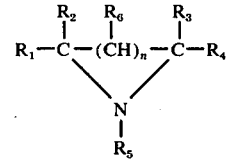

where $R_1$, $R_2$, $R_3$, $R_4$ and $R_5$ are each selected from the group consisting of hydrogen, alkyl, aryl, alkaryl, hydroxyalkyl and aralkyl, $R_6$ is selected from the group consisting of hydrogen and lower alkyl and $n$ is an integer from 0 to 1.

3. A coating composition according to claim 2 wherein said alkylenimine is selected from the group consisting of ethylenimine, 1,2-propylenimine, and N-hydroxyethyl ethylenimine.

4. A coating composition according to claim 2 wherein said urethane reaction product is the reaction product of an organic polyisocyanate and a polyhydric material with the major portion of said polyhydric material being selected from the group consisting of polyether polyols, polyester polyols, and mixtures thereof and wherein said polyhydric material contains no more than about 1 gram mole of compounds having a functionality of 3 or more per 500 grams of polyhydric material.

5. A coating composition according to claim 4, further including a polymeric polyol having a glass transition temperature below about 25° C.

6. A coating composition according to claim 4, wherein the major portion of said polyhydric material is a polyester polyol formed from an alcohol component having an average functionality of at least about 1.9, and an acid component consisting essentially of one or more monomeric carboxylic acids or anhydrides having 2 to 14 carbon atoms per molecule, said acid component having an average functionality of at least about 1.9.

7. A coating composition according to claim 4 wherein the major portion of said polyhydric material is a polyether polyol having a hydroxyl equivalent of at least about 100.

8. A method of producing a coating composition of improved pigment wetting properties comprising:
   A. forming an ungelled, hydroxyl-containing urethane reaction product having an intrinsic viscosity of 1.0 deciliter per gram or less;
   B. reacting the urethane reaction product with an acidic carboxyl source material, with said source material being present in an amount sufficient to yield a hydroxyl-containing urethane reaction product containing at least 0.075 percent by weight of acidic carboxyl groups;

C. reacting the thus-formed carboxyl-hydroxyl containing urethane reaction product with an alkylenimine, said alkylenimine having 2 or 3 carbon atoms per alkylenimine ring;

whereby at least about 0.03 percent by weight of the acidic groups based on total weight of the carboxyl-hydroxyl containing urethane reaction product are reacted with the imine;

D. adding an aminoplast resin to the imine-modified urethane reaction product.

9. The method of claim 8 in which the acidic carboxyl source material is selected from the group consisting of tartaric acid, glycolic acid, dimethylol propionic acid and acid-containing polyesters.

10. The composition of claim 1 which contains from 40 to 95 percent by weight of the imine-modified hydroxyl-containing urethane reaction product and from about 5 to 60 percent by weight of aminoplast resin.

11. The method of claim 8 which contains from 40 to 95 percent by weight of the imine-modified polyurethane polyol and from about 5 to 60 percent by weight of aminoplast resin.

* * * * *

UNITED STATES PATENT AND TRADEMARK OFFICE
CERTIFICATE OF CORRECTION

PATENT NO. : 4,018,849
DATED : April 19, 1977
INVENTOR(S) : Wen-Hsuan Chang, Roger L. Scriven, Paul J. Prucnal It is certified that error appears in the above-identified patent and that said Letters Patent are hereby corrected as shown below:

Column 7, line 67, insert --acidic-- after "introduce".

Column 15, line 19, "mixutre" should be --mixture--.

Column 16, line 10, "was" should be --has--.

Signed and Sealed this fifth Day of July 1977

[SEAL]

Attest:

RUTH C. MASON
Attesting Officer

C. MARSHALL DANN
Commissioner of Patents and Trademarks